Oct. 13, 1970     L. J. NAVA ETAL     3,533,805
METHOD FOR THE MANUFACTURE OF LOW DENSITY PRODUCTS
Filed Dec. 14, 1966     4 Sheets-Sheet 2
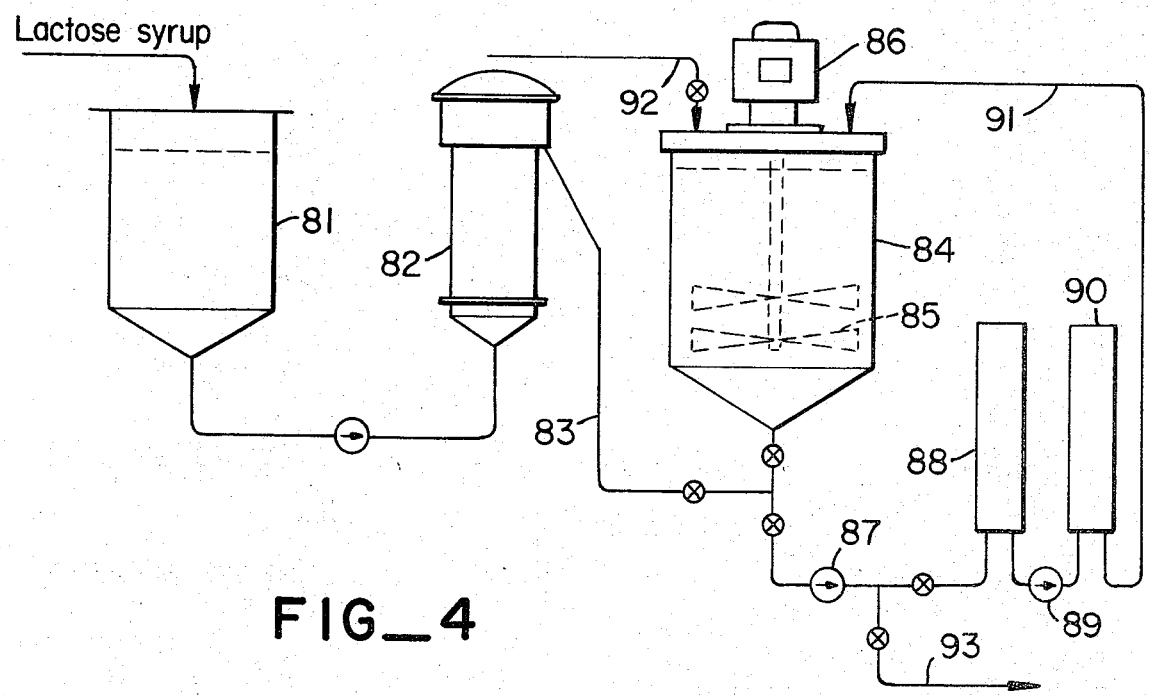
FIG_4
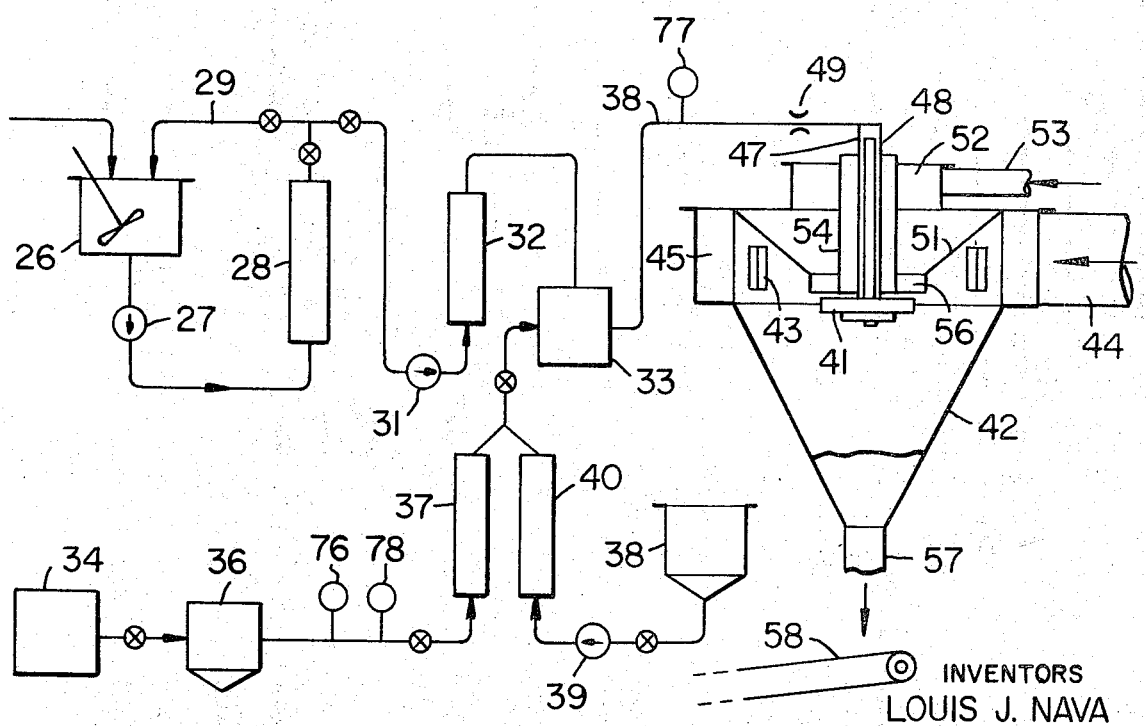
FIG_3A
INVENTORS
LOUIS J. NAVA
GAYLORD M. PALMER
JERRY T. HUTTON
BY *Filehr, Hohbach, Test,*
*Albritton and Herbert*
ATTORNEYS

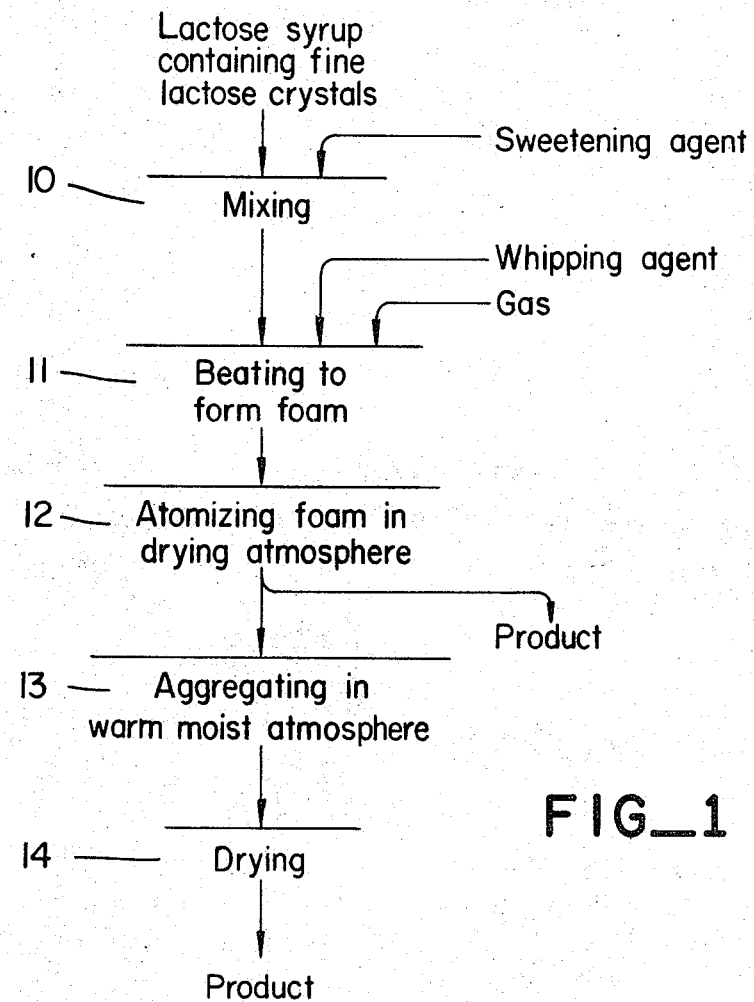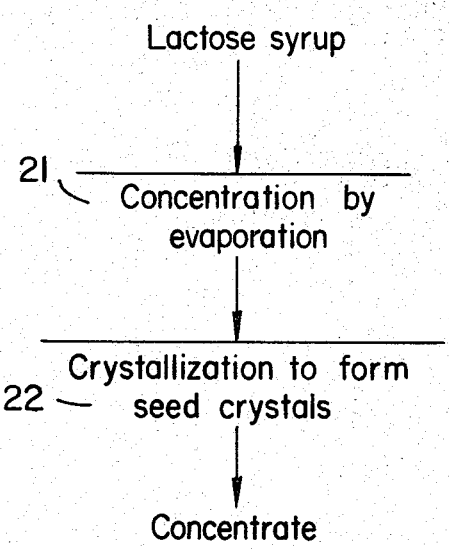

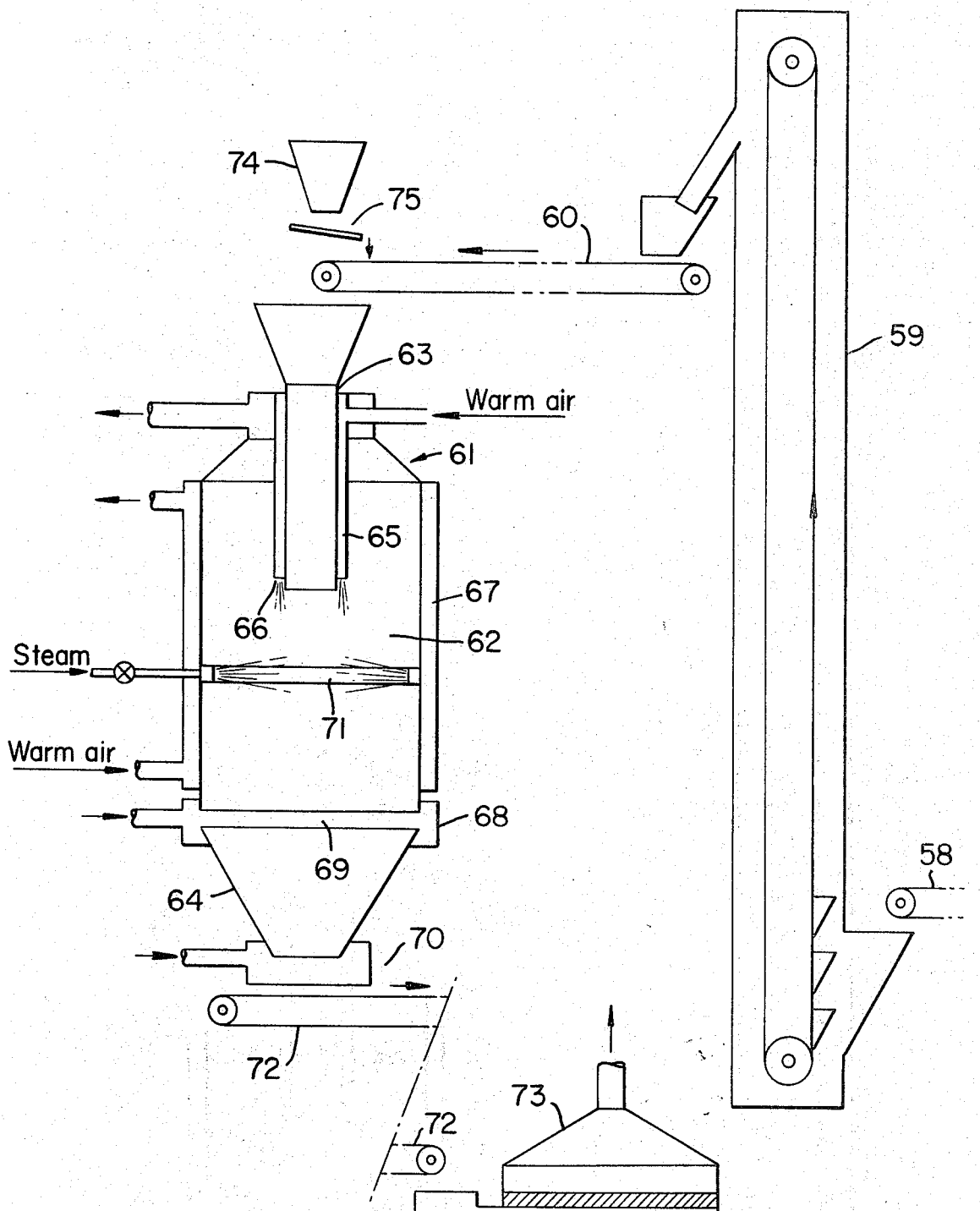
FIG_3B

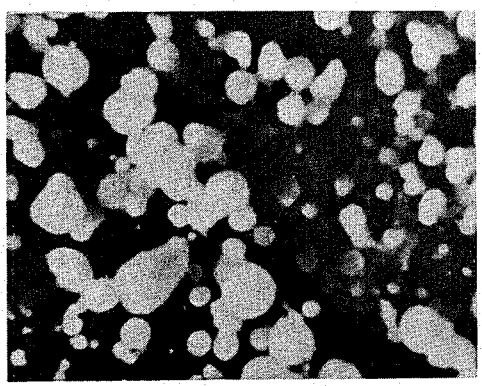
FIG_5
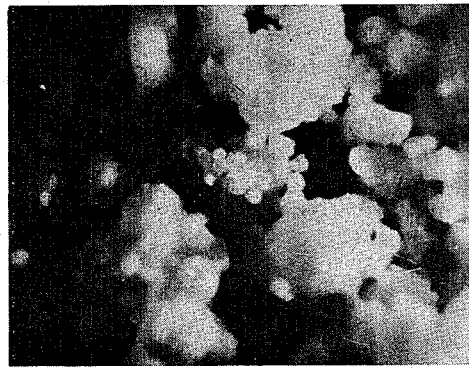
FIG_6
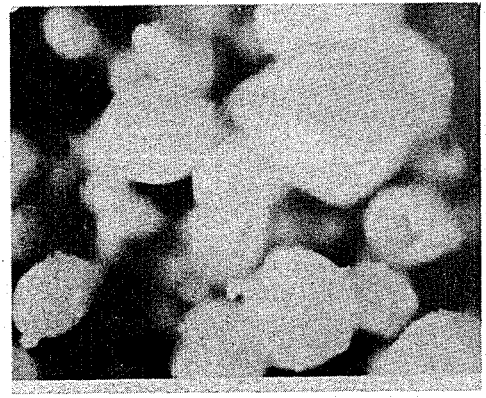
FIG_7
INVENTORS
LOUIS J. NAVA
GAYLORD M. PALMER
JERRY T. HUTTON
BY
*Fleke, Hobbach, Test,*
*Albritton and Herbert*
ATTORNEYS

United States Patent Office 3,533,805
Patented Oct. 13, 1970

3,533,805
METHOD FOR THE MANUFACTURE OF LOW DENSITY PRODUCTS
Louis J. Nava, Redwood City, Gaylord M. Palmer, Castro Valley, and Jerry T. Hutton, Glen Ellen, Calif., assignors, by mesne assignments, to Foremost-McKesson, Inc., a corporation of Maryland
Filed Dec. 14, 1966, Ser. No. 601,658
Int. Cl. A23l 1/26
U.S. Cl. 99—141           8 Claims

ABSTRACT OF THE DISCLOSURE

Manufacture of low density lactose, spheroidal-shaped particles with cellular interiors which are free flowing and readily soluble in hot or cold water. The product may contain added sweetener. The method involves foaming a lactose syrup concentrate with lactose seed crystals by beating the syrup with a whipping agent and air at above atmospheric pressure, reducing the pressure on the foam to atmospheric so that the foam is expanded, thereafter centrifugally atomizing the expanded foam without shattering impacts, and drying with a drying gas. In one embodiment the product so obtained is further processed by aggregating to produce an aggregated final product.

---

In general the subject invention pertains to the manufacture of low density dry discrete lactose products having free-flowing characteristics and which can be readily dissolved in cold water or hot water.

Dry discrete products of low bulk density are desirable for many purposes. In the food industry, such products may be used to lend bulk and free-flowing properties to premixes or other packaged materials. Lactose, when in the form of a fine dry powder, lacks free-flowing characteristics and is relatively high in density. Such powder is difficult to dissolve in cold water by simple stirring because of the tendency to form lumps. Also lactose, when in the form of a spray dried powder, tends to become sticky due to hygroscopicity and is relatively high in density. Lactose powder has been subjected to so-called instantizing processing, as by passing the powder through a hydrating and aggregating chamber where the particles are moistened to cause them to become sticky and then brought into random contacts to form aggregates (Pat. 2,856,318). Such processing improves wettability and dispersibility in water, and serves to produce products having somewhat lower bulk density, as for example, from 250 to 450 grams per liter. However, such bulk density is higher than is desired for many purposes, and the solubility rate in cold water is not rapid. In this connection, particular reference can be made to the manufacture of a sweetening product intended to be used in place of granulated sugar, namely one consisting principally of lactose together with an artificial sweetening agent such as calcium cyclamate, calcium saccharine, or preferably both (Pat. 3,014,803).

It is an object of the present invention to provide a method for the manufacture of lactose products of low bulk density having free-flowing characteristics, high wettability, and which are readily dispersible in cold or hot water with simple stirring.

Further objects and features of the invention will appear from the following description in which the preferred embodiments have been set forth in detail in conjunction with the accompanying drawing.

Referring to the drawing:

FIG. 1 is a flow sheet illustrating the steps of our method;

FIG. 2 is a flow sheet illustrating a method suitable for preparing a concentrate for further processing;

FIGS. 3A and 3B taken together form a schematic diagram showing apparatus for carrying out the method; and FIG. 4 schematically illustrates apparatus for preparing a concentrate for further processing.

FIGS. 5, 6 and 7 are reproductions of microphotographs showing products as herein described.

The present method consists in preparing a concentrated lactose syrup having a substantial part of its lactose content in the form of fine lactose seed crystals. At this point a sweetening agent may be added, concentrate is then subjected to beating together with a whipping agent and a gas such as air to form a relatively stiff foam. The foam is fed to a spray drying operation utilizing a centrifugal atomizer of the type which does not use shattering impacts and which is capable of producing discrete or atomized particles without serious disruption of the foam cells. The particles discharging from the atomizer are dispersed in a hot drying gas whereby they are converted to a discrete dry material. The disclosed apparatus is especially adapted to carry out the foregoing steps. The resulting discrete material may be used as a final product, or this product may be further processed by passing the same through an aggregating operation. After treatment in the aggregating operation, the discrete material may be subjected to final drying. The final product produced has a density within the range of from 80 to 200 grams per liter. A substantial part of the lactose content is crystallized in the form of alpha lactose monohydrate, whereby the product is relatively non-hygroscopic. The discrete particles produced by the spray drying operation are identifiable in the aggregated product. They are spheroidal shaped, and with interior and exterior walls that are porous and within which fine lactose crystals are dispersed. Such a product is not sticky or dusty, it has high wettability, and it readily disperses in either cold or hot water with simple stirring.

The steps of the method as illustrated in FIG. 1 consist in supplying concentrated lactose syrup containing fine lactose seed crystals to the mixing operation 10, where it is mixed with an artificial sweetener as indicated. Instead of introducing the sweetening agent at this point, it may be introduced in the subsequent beating operation. In step 11 the concentrate is subjected to mechanical beating together with a gas and a whipping agent to form a foam. Before processing in step 11 it is desirable to heat the material to an elevated temperature such as from 140 to 180° F.

The sweetening agent can be a suitable cyclamate or saccharine such as calcium cyclamate or calcium saccharine. Preferably, both calcium cyclamate and calcium saccharine are employed.

The lactose syrup as supplied to step 11 may have a concentration of from 35 to 60% solids and the fine crystals present may amount to from 5 to 25% of the total lactose content. The whipping agent may be a suitable protein hydrolysate having whipping properties, such as soya bean protein hydrolysate.

The gas supplied to step 11 may be air, or other gases may be used, such as nitrogen, carbon dioxide and the like. The amount of gas employed may range from about 1.5 to 15 cubic feet (at 125° F.) per gallon of the liquid mix.

The foam produced in step 11 is then subjected to a spray drying operation which involves atomizing the foam and causing the resulting discrete particles to be dispersed in a drying atmosphere, such as hot air. With respect to atomizing the foam, we have found that conventional centrifugal atomizers which utilize shattering impacts serve to break down the foam by disrupting the foam cells, whereby the desired end product is not obtained. We have discovered that when a stacked disk centrifugal atomizer of the type disclosed in Peebles et al. 2,814,527 is employed, the foam cells are not seriously disrupted, and the dry discrete material produced is altogether different in that the dry particles are spheroidal, with the exterior walls of the particles being porous. The interiors of the bulk of the particles have numerous cell spaces or cavities separated by porous septa that are likewise porous with fine lactose crystals dispersed therein. According to our observations, a centrifugal atomizer of the type disclosed in said Peebles et al. patent causes the foam to be broken up into discrete patricles by discharge from the peripheral edges of rotating disks, without disruptive impacts. This serves to form discrete particles which retain the foam numerous cells, and it is such particles that produce a discrete dry product according to the present invention.

During spray drying some crystallization of lactose occurs due to the seeding action of the crystals present in the feed concentrate. The extent of such crystallization depends on control of the drying conditions as will be presently explained.

The spray dried material from step 12 may be used without further processing as indicated in FIG. 1. Its moisture content may vary from 1.2 to 4.5%, depending on the drying conditions maintained. As will be presently explained in greater detail, the drying conditions in the spray drying operation may be such as to produce a product which has the major part of its lactose in crystalline form.

The product obtained from spray drying has a bulk density within the range of from 80 to 200 grams per liter. The particles are of a size ranging from about 30 to 500 microns, with the major part of the material ranging from 80 to 250 microns.

In many instances it is desirable to subject the spray dried product to further processing to promote more complete crystallization of lactose and to increase the average particle size. Thus the spray dried material is shown being subjected to the aggregating operation 13 which may be of the type disclosed in Pat. 2,856,318. The dry material from the spray drying operation, which may have a total moisture content of from 1.2 to 4.5%, is passed through a chamber where it is subjected to a warm moist atmosphere. The surfaces of the particles are made sticky, and the particles are caused to be brought into random contacts whereby the particles cling together as aggregates. Thereafter these aggregates, which may have a total moisture content ranging from 3.5 to 10%, are subjected to final drying 14 to produce a final product which may have a total moisture content of from 1.5 to 5.5%. The drying operation is carried out with a minimum amount of attrition whereby the aggregates formed remain substantially intact. The aggregated product has a slightly higher bulk density than the product produced by the spray drying operation. However, the aggregated product is desirable in that it has improved flow characteristics, the particle size is increased, and there is an absence of fine dust particles.

When the product is subjected to the aggregating operation, this step is carried out in such a manner as to cause further crystallization of lactose, whereby the amount of lactose in crystallized form is increased in the final product. Preferably a holding period is interposed between aggregating and final drying during which lactose crystallization is promoted.

FIG. 2 illustrates a suitable procedure for preparing the concentrated lactose syrup. Thus a refined lactose syrup, which may contain from 35 to 45% solids, is further concentrated by vacuum evaporation in step 21 to produce a concentrated syrup which may contain from 50 to 63% solids. This syrup is then supplied to the crystallizing operation 22. As supplied to the crystallizing operation, the concentrate may be at a temperature of from 80 to 140° F. In the crystallizing operation, which is carried out in the presence of continuous agitation, fine dispersed crystals are formed whereby at the end of the crystallizing operation from 15 to 35% of the lactose is in the form of fine seed crystals. Preferably the crystallizing operation is carried out with shock cooling.

While the procedure just described is preferred, it is posible to prepare the concentrate by mixing fine seed crystals of lactose in water or a suitable refined sugar syrup.

Referring to the equipment of FIGS. 3A to 3B, the concentrate is supplied to the feed tank 26, which is equipped with a suitable agitator. This tank is connected by piping to a reheating circuit including the pump 27, and heater 28. Thus the concentrate can be continuously recirculated through a bypass line 29 to bring it to a suitable temperature level such as 150 to 210° F. A pump 31 that is preferably of the positive displacement type takes the liquid material from the reheater circuit and delivers it through the flow meter 32 to the beater device 33. This device also receives compressed air from the compressor 34. The compressor delivers air through the filter 36 and the flow meter 37. The whipping agent is also supplied to device 33 from tank 38. The agent, in liquid form, is delivered by positive displacement pump 39 through the flow meter 40. The beater consists of a closed chamber supplied with high speed agitating means capable of effective beating or whipping action.

From the beater device 33 the foam is delivered through the pipe 38 to the centrifugal atomizer 41 of the spray drying equipment. This equipment consists of a spray drying chamber 42 having its upper portion arranged to receive tangentially directed hot air. Thus the upper portion of the chamber is shown provided with openings 43 which are louvered to direct the incoming air tangentially. Hot air is supplied through the connecting duct 44 and 45. Within the drying chamber 42 there is the centrifugal atomizer 41 of the stacked disk type, as for example, the atomizer shown in the aforesaid Peebles et al. Pat. 2,814,527. The annular feed manifold within the atomizer has two feed pipe connections 47 and 48 with the pipe 38, through the restricting orifice 49. Orifice 48 serves to maintain a desired pressure within beater device 33 and the pipe line 38, as for example, a pressure of the order of from 40 to 120 p.s.i. On the discharge side of the orifice 49 and in the feed lines 47 and 48, the pressure is substantially atmospheric. Therefore the foam as it is delivered to the interior of the atomizer 41 is at substantially atomspheric pressure. Because of the release of pressure as the foam passes through the orifice 49, there is a great increase in foam volume. The journalling of the atomizer shaft and the arrangement of feed lines may be substantially as shown in Peebles 2,574,705.

It is desirable to provide a down draft of hot air in the area immediately surrounding the periphery of the atomizer 41. Thus the upper part of the chamber 42 is provided with the conical partition wall 51 which receives hot air from the exterior box 52 and duct 53. A cylindrical shroud 54 is shown disposed about the drive shaft of the atomizer. The central part of the partition 51 forms an annular opening 56 about the shroud 54 whereby air is directed downwardly in a region immediately surrounding the periphery of the atomizer 41. The discharge conduit 57 at the lower end of the chamber 42 is shown supplying the dried material to the conveying means 58, which may be of the endless belt type.

In instances where the product from the spray dryer is used without further processing, any excess moisture present can be removed by a suitable dryer, such as one of the shaker type. Assuming however that the spray dried material is subjected to aggregating, we can employ the additional equipment shown in FIG. 3B. Thus conveyer 58 delivers the material to the elevator 59, which together with conveyer 60 delivers the material to the hydrating and aggregating apparatus 61. This consists of a jacketed chamber 62 having a downwardly extending inlet conduit 63 and a lower collecting cone 64. The interior portion of conduit 63 is provided with jacket 65 that receives warm air. Air is discharged through openings in the lower end 66 of the jacket. Warm air is also circulated through the jacket 67 of chamber 62. A jacket or ring 68 surrounds the annular opening 69 between the lower end of the chamber 62 and cone 64 and receives conditioned air. A shroud or ring 70 surrounds the lower discharge opening of cone 64 and receives air as indicated. This air is conditioned whereby it remains constant with respect to temperature and relative humidity. A perforated annular pipe 71 is located within the chamber 62 and is connected with a steam supply pipe. Conveyer 72 receives moist aggregates and delivers them to the dryer 73, which may be one of the shaker type in which the aggregates are contacted with warm air to remove excess moisture.

Suitable sizing equipment can be used to size the final dried material, with return of undersized fines to the process by way of hopper 74 and vibrated feeder 75.

Operation of the apparatus shown in FIGS. 3A and 3B is as follows. Lactose concentrate containing fine crystals of lactose is delivered continuously to the mixing tank 26, and is continuously recirculated through the heater 28 and bypass pipe 29. Concentrate at a desired temperature level, such as from 150 to 210° F., is continuously withdrawn through pump 31 and supplied to the beater 33. In the closed chamber of this beater the concentrate is subjected to intense mechanical beating action together with air and the whipping agent. The beating or whipping taking place at this point is carried out under a pressure substantially above atmospheric, as for example, a pressure within the range of 40 to 120 p.s.i. This pressure is determined by the pressure of the incoming air as indicated by gauge 76. Also as previously explained, pressure is maintained in the discharge line 38 from beater device 33 as indicated by gauge 77. The temperature of the compressed air should be maintained constant and can be indicated by thermometer 78.

The foam formed under pressure in device 33 is caused continuously to flow through line 38 and orifice 49, after which it expands in volume in the feed lines 47 and 48 to the atomizer 41. Such expanded foam is delivered to the interior of the atomizer 41 and caused to pass through the stacked disks of the atomizer and to be discharged from the periphery of the atomizer in the form of foam particles. The foam particles are dispersed in the hot dry air within the dryer chamber 42 thereby effecting flash drying with delivery of discrete material through the conduit 27 and to the conveyer 58.

Conveyer 58 serves to deliver the material from the spray drying equipment to the elevating conveyer 59 and from thence to the belt conveyer 60. It is caused to drop from the discharge end of conveyer 60 through the conduit 63, during which time it is dispersed in the air. It falls in dispersed condition from the lower open end of the conduit 63 and is contacted by the warm moist atmosphere maintained by steam discharging from the pipe 71.

Contact with the warm moist atmosphere causes the particles to become moist and sticky and the particles during downward movement are caused to be brought into random contacts to form moist aggregates. These aggregates are delivered by the collecting cone 64 to the conveyer 72. This in turn delivers the moist aggregates to the dryer 73 where excess moisture is removed without substantial breakage or crushing of the aggregates. Assuming that a sizing operation is carried out after the aggregates have been dried, reject fines can be returned to the hopper 74 from which they are delivered to the conveyer 60 and fed to the aggregating apparatus 61.

The conveyer 72 provided between the aggregating apparatus 61 and the final dryer 73 provides a holding period during which further lactose crystallization takes place. This may be a period of the order of from 1 to 5 minutes.

FIG. 4 illustrates suitable equipment which can be used to prepare the lactose concentrate. It consists of a tank 81 for receiving the refined lactose syrup and which supplies the syrup to the concentrator 82. The concentrator should be of a type capable of producing concentrates of the order of 57 to 63% solids without material heat deterioration. The dischage line 83 from the concentrator serves to deliver material to the crystallizing tank 84. This crystallizer is of the batch type and is provided with an agitator 85 driven by motor 86. It is connected to an external cooling circuit including the pump 87, heat exchange cooler 58, pump 89, heat exchange cooler 90 and the return line 91. A line 92 is shown for the introduction of a synthetic or artificial sweetener. Valve controlled line 93 serves to discharge the concentrate from the outlet side of pump 87 to the apparatus of FIG. 3A.

In the batch operation of the apparatus shown in FIG. 4, a quantity of refined lactose syrup is supplied to the tank 81, and this syrup is then concentrated by passing the same through the concentrator 82. The concentrator 82 supplies the concentrate to the crystallizing tank 84. When a sufficient amount of material is in the crystallizing tank, a crystallizing cycle can be carried out as follows. With the agitator 85 in operation, the pump 87 is placed in operation and the valves operated to cause the concentrate to be circulated through the cooling stages 88 and 90. Assuming that the concentrate is initially at a temperature of 125 to 165° F., at the beginning of the cycle, cooling can be carried out to rapidly lower the temperature level of about 80 to 120° F. During this time a substantial number of seed crystals of lactose are formed, and these crystals are relatively quite fine due to shock cooling and to the presence of continuous agitation. By properly controlling the time and temperature conditions and the rate of cooling a predetermined amount of the lactose can be crystallized to provide a proper material for supplying to the apparatus of FIG. 3A. The sweetening agent can be added in dry form at the end of the crystallizing cycle.

Previous reference has been made to using the product discharging from the spray dryer. When the dryer is operated to produce a product having a low moisture content of from 1.2 to 4.5% little if any of the particles are in the form of aggregates. Such a product can be used as a filler with other discrete materials (e.g., in pre-mixes containing cereal flour and the like). When the dryer is operated to increase the moisture content of the discharging material, an increased amount of hydration takes place during spray drying, and an increased percentage of the material is in the form of aggregates. Operation to provide a moisture content of from 6 to 10% with some retention on the walls of the dryer serves to aggregate the product to the extent that it appears to be granular.

When the spray dryer is operated to discharge material having a moisture content in excess of about 4.5%, excess moisture should be removed by final drying before the material is packaged or otherwise employed. A hold period of from 1 to 5 minutes can be interposed before final drying to promote further crystallization. A product as just described is free-flowing and has good wettability and dispersibility in cold or hot water. Also it is hydrated to the extent that it is relatively nonhygroscopic when exposed to the atmosphere.

In actual practice, the moisture content of the material discharging from the spray dryer has been maintained within the range of from 1.2 to 4.5%, where the material is further processed by aggregating. However, the moisture content may advantageously be maintained within a higher range of from 4.5 to 8% to increase the capacity of the dryer and to promote crystallization within the spray dryer and during transit to the aggregating apparatus.

EXAMPLE NO. I

A refined lactose syrup containing 40% lactose solids was concentrated and pre-crystallized by apparatus such as shown in FIG. 4. The syrup was concentrated to 63% solids in the evaporator 77, and supplied to the crystallizing tank 79 at about 105° F. The agitator 81 of the crystallizer tank was operated continuously at about 56 r.p.m. A crystallizing cycle was carried out by continuously recirculating the concentrate through pump 82 and the coolers 83 and 85. The cooling was such as to reduce the temperature of the concentrate from 150° F. at the beginning of the cycle to about 105° F. over a period of about 1 minute. The concentrate was then held at the lower temperature level for a period sufficient to reduce the dissolved solids to about 40%. This crystallizing cycle served to crystallize 55% of the lactose in the form of fine seed crystals of alpha lactose monohydrate. A dry sweetening agent was then added, consisting of calcium cyclamate and calcium saccharine in amounts sufficient to provide 5.4 and 0.45% respectively in the final dried product. The sweetened concentrate produced as just described was then processed by the equipment shown in FIG. 3A. The material introduced into the tank 26 of FIG. 3A was continuously agitated and was recirculated through pump 27 and heater 28 to elevate the temperature to about 170° F. The material at this temperature was then supplied by pump 31 to the beater 33. The beater was supplied with air under pressure at 125° F. and at a pressure of about 80 p.s.i. The quantity of air supplied was about 10 cubic feet of air for each gallon of concentrate processed. The chamber of the beater 33 was also continuously supplied with a liquid whipping agent, the flow of whipping agent being metered whereby a substantially constant proportionate amount was added to the concentrate. The whipping agent employed was soya bean protein hydrolysate manufactured by Gunther Products Company and identified by manufacturer's product No. D–100WA. The rate of supply was such that 0.7% (dry solids basis) of such protein hydrolysate was contained in the liquid content of the foam being delivered through line 38. The pressure maintained in line 38 was about 70 p.s.i. This foam was continuously supplied through the orifice 49 to the atomizer 41 of the spray dryer 42. The spray dryer was operated with inlet air temperatures through conduits 44 and 53 of about 330° F. and with an outlet temperature of about 215° F. The centrifugal atomizer 41 was of the type disclosed in said Peebles et al. Pat. 2,814,527. It had an outside diameter of 11.5 inches and was operated at a speed of about 9000 r.p.m. The discrete material delivered through the conduit 57 of the spray dryer had a total moisture content of 1.9%. This material was delivered by the conveyers 58, 59 and 60 to the aggregating apparatus 61. The aggregating apparatus 61 was supplied with saturated steam at a pressure of 35 p.s.i. The discrete material delivered into the upper part of the chamber 62 fell downwardly by gravity and was collected in the cone 64 in the form of moist aggregates. The jacket 67 was maintained at a temperature of 120° F. The humidity and temperature of air entering the rings 68 and 70 was 35% RH and 45° F. The material leaving cone 64 was at 65° F. The product remained on conveyer 72 for a holding period of 3 minutes, during which time the temperature raised to 90° F. The total moisture content of this material was 7.5%. This moist material was then subjected to drying in the dryer 73 to produce a final product having a total moisture content of 4.0%.

The product produced by the foregoing example had a particle size ranging from about 30 to 1500 microns, with the bulk of the material ranging from 300 to 1000 microns. When viewed by microscope, most of the particles were aggregates. The particles bonded together to make up the aggregates were spheroidal shaped, with fine lactose crystals dispersed in the walls. The crystals were bonded together in such a manner as to form connected voids therebetween whereby the walls of the particles were porous. Some such crystals were found to be present in the material leaving the spray dryer 42, but a substantial part of the lactose of such particles was in the glass state.

According to our observations, some crystallization of lactose took place within the spray dryer due to the presence of seed crystals of lactose, and substantial additional crystallization took place during processing after spray drying, including treatment within the aggregating apparatus 61, retention of the material on the conveyer 72, and during the initial stages of the final drying. The porous walls included the septa between the numerous cells or cavities forming the interiors of the spray dried particles.

As withdrawn from the spray dryer the product produced by the foregoing example had a bulk density of about 150 grams per liter, and the final dry product taken from the dryer 73 had a bulk density of 185 grams per liter. When a quantity of the final product was deposited upon the surface of cold water, it wet and sank in a few seconds. It dissolved immediately upon simple stirring with a spoon. We attribute high wettability of the product to the fact that the particles making up the aggregates were relatively porous, having reference to porosity of the exterior walls and the interior septa walls between the numerous inner cells of the spheroidal shaped particles. The product also has good freeflowing characteristics and was well adapted for use in packaging and filling equipment. It could be readily poured from a carton having a pour spout. Although the product had a relatively low bulk density, the aggregates and the particles making up the aggregates had sufficient strength to withstand packaging and handling, without serious disintegration into smaller size particles.

EXAMPLE NO. II

The procedures and apparatus employed were the same as in Example No. 1, up to the point of forming a foam and supplying the same under a pressure of about 70 p.s.i. through line 38 and from thence to the atomizer 41. Drying conditions within the dryer chamber 42 were adjusted by reducing the air outlet temperature to provide discharging discrete material having about 6% total moisture. After a holding period of about 8 minutes, this material was passed through a dryer (like dryer 73) to produce a product which was less hygroscopic than the spray dried material produced in Example No. I, due to further hydration during and immediately following spray drying. This product had a bulk density of about 165 grams per liter and was noticeably more granular than the product produced by spray drying in Example No. I, due to the presence of some aggregates.

EXAMPLE NO. III

The product produced by Example No. II, before final drying, was subjected to aggregating and final drying by substantially the same procedure and equipment as in Example No. I. The moisture content of the material leaving the aggregating apparatus was about 9% and the moisture content of the final dried material was 4%. The bulk density of the final product was 185 grams per liter, and the bulk of the particles had a size ranging from 300 to 1000 microns. This product was non-hygroscopic, being superior in this respect to the product of Example No. II. Also it had substantially the same flow, wettability and dispersibility properties as the final product of Example No. I.

EXAMPLE NO. IV

The procedure and apparatus employed were the same as in Example No. I, up to the point of forming a foam and supplying the same under a pressure of about 70 p.s.i. through line 38 and from thence to the atomizer 41. However, drying conditions within chamber 42 were adjusted by reducing the outlet air temperature to provide discharging discrete material with a moisture content of 10%. The discrete material was permitted to lodge on the side walls of chamber 42 for an average period of retention, which served to promote crystallization and formation of aggregates. The moist discharging material after holding for about 2 minutes was passed through a final dryer (like dryer 73) to reduce the moisture content to about 4.2%. The material was granular in appearance and the bulk of the particles were aggregates formed of hollow spheroidal shaped particles as previously described. The bulk density was 180 grams per liter and the particle size ranged from 30 to 1500 microns. This product was relatively non-hygroscopic when exposed to the atmosphere and had substantially the same free-flow, wettability and dispersibility properties as the material produced by Example No. I.

FIGS. 5, 6 and 7 show some of the characteristics of products obtained in Example No. I. FIGS. 5 and 6 were taken with × 28 magnification, and FIG. 7 was taken with × 100 magnification. FIGS. 5 and 7 show the product with agglomeration, and FIG. 6 shows the product after agglomeration. The smallest division of the scales appearing in FIGS. 5 and 6 are 40 microns, and in FIG. 7 they are 16 microns. FIGS. 5 and 7 reveal the spheroidal shape of the spray dried particles. FIG. 7 in particular shows the porous character of the outer walls which makes for high wettability. FIG. 6 reveals that the walls of the agglomerates consist essentially of the wall structures of the spray dried product. It is evident that when the spheroidal shaped particles are joined into aggregates the exterior and interior septa wall structures are somewhat distorted in regions where the particles are bonded together, thus forming a body of irregular form with many connected spheroidal-shaped portions and some relatively intact spheroidal-shaped particles attached to the main body of the aggregates. According to our observations the porous wall structure of the spray dried particles is identifiable in the aggregates, although the porous wall structures of the aggregate contain a greater percentage of its lactose content in crystalline form.

The manner in which the aggregates are formed as described above accounts for the fact that the bulk density of the final aggregated product is somewhat higher than that of the spray dried material before being aggregated.

It has been explained that the porous nature of the exterior and interior septa walls of our products contributes to wettability and dispersibility in cold water. The porous wall structures provide high absorptivity because of the capular dimensions of the voids therein. Since all of these walls rapidly disintegrate when contacted with water, air from the interior cells or cavities may escape, thus permitting rapid sinking after being deposited in the surface of the water. Also this prevents any substantial incorporation of air with resultant foaming when the product is dispersed in water with agitation. In addition to these advantages the interior septa walls lend strength to the spray dried product and the aggregates made from the same.

We claim:

1. A method for the manufacture of low density dry discrete products consisting essentially of lactose, comprising forming a lactose syrup concentrate containing seed crystals of lactose, beating the concentrate in the presence of a whipping agent and a gas while at a pressure above atmospheric to form a homogeneous foam, reducing the pressure on the foam to atmospheric to expand the same, and thereafter spray drying the expanded foam by centrifugally atomizing the same without shattering impacts to form foam particles and by dispersing the foam particles in a drying gas.

2. A method as in claim 1 in which the beating to form a foam is carried out while the concentrate is at a temperature of from 140 to 180° F.

3. A method as in claim 1 in which the foam is atomized by discharging it from the peripheries of rapidly rotating disks.

4. A method for the manufacture of low density dry discrete products consisting essentially of lactose, comprising forming a lactose syrup concentrate with lactose seed crystals, beating the concentrate together with a whipping agent and air while at a pressure above atmospheric whereby a foam is formed, reducing the pressure on the foam to atmospheric whereby the foam is expanded, thereafter centrifugally atomizing the expanded foam without shattering impacts to form foam particles, dispersing the foam particles in a drying gas to dry the same, subjecting the resulting dry discrete material to an aggregating operation in which the discrete particles are contacted with a warm moist atmosphere to make the particles sticky and the particles brought into random contacts to form random aggregates, and then removing excess moisture from the aggregates.

5. A method as in claim 4 in which the concentrate is at a temperature of from 140 to 180° F. at the time it is subjected to beating.

6. A method for the manufacture of low density dry discrete products consisting essentially of lactose, comprising forming a concentrated lactose syrup containing fine lactose seed crystals, subjecting the concentrate to beating at a pressure above atmospheric together with a whipping agent and gas to form a homogeneous foam, reducing the pressure on the foam to atmospheric to cause the foam to expand, thereafter centrifugally atomizing the expanded foam without shattering impacts to form cellular foam particles, dispersing the foam particles in a drying gas to dry the same, subjecting the resulting particles to an aggregating operation in which the particles are contacted with a moist warm atmosphere whereby the particles are made sticky and brought into random contacts to adhere together in the form of random aggregates, and then subjecting the aggregates to drying to remove excess moisture.

7. A method as in claim 6 in which the concentrate contains a synthetic sweetening agent.

8. A method for the manufacture of a low density dry discrete product suitable for use as a sweetening material, the product consisting essentially of lactose in crystalline form together with an artificial sweetening agent, comprising forming a liquid concentrate of lactose together with the sweetening agent and lactose seed crystals, beating the concentrate with air and a whipping agent at a pressure above atmospheric to form a homogeneous foam, reducing the pressure to atmospheric to expand the foam, thereafter subjecting the expanded foam to centrifugal atomization without shattering impacts to form foam particles, dispersing the foam particles in a hot drying gas to form a discrete material, holding the discrete material to promote crystallization of lactose, contacting the discrete material with a warm moist atmosphere to make the particles sticky and to cause the sticky particles to contact and adhere together in the form of moist aggregates, and then removing excess moisture from the aggregates.

References Cited

UNITED STATES PATENTS

| | | | |
|---|---|---|---|
| 2,788,276 | 4/1957 | Reich et al. | 99—71 |
| 2,814,527 | 10/1957 | Peebles et al. | 239—214 |
| 3,014,803 | 12/1961 | Peebles et al. | 99—141 |
| 3,170,801 | 2/1965 | McNaught | 99—141 |

A. LOUIS MONACELL, Primary Examiner

R. B. ANDEWELT, Assistant Examiner

U.S. Cl. X.R.

99—199; 127—31